J. H. HALL.
MOTOR CONTROL SYSTEM.
APPLICATION FILED DEC. 7, 1917.

1,275,909.

Patented Aug. 13, 1918.

INVENTOR.
Jay H. Hall
BY F. N. Barber
ATTORNEY.

UNITED STATES PATENT OFFICE.

JAY H. HALL, OF CLEVELAND, OHIO, ASSIGNOR TO THE ELECTRIC CONTROLLER & MANUFACTURING COMPANY, OF CLEVELAND, OHIO, A CORPORATION OF OHIO.

MOTOR-CONTROL SYSTEM.

1,275,909.  Specification of Letters Patent.  Patented Aug. 13, 1918.

Application filed December 7, 1917. Serial No. 205,942.

*To all whom it may concern:*

Be it known that I, JAY H. HALL, a citizen of the United States, residing at Cleveland, in the county of Cuyahoga and State of Ohio, have invented new and useful Improvements in Motor-Control Systems, of which the following is a specification.

This invention relates to motor control systems, and particularly to control systems for motors having shunt wound fields, in which the speed of the motor may be increased or decreased at will by varying the field strength.

In motor control systems of this class an adjustable resistance is usually provided to vary the field strength of the motor. If, during the operation of the motor, this field resistance be changed by a large increment to give a correspondingly large variation of speed, the sudden change in field strength will cause a dangerously large fluctuation or surge of current to flow in the motor armature.

It is the object of this invention to provide a simple, inexpensive, and efficient means to protect the motor armature against excessive surges of current when the field strength is varied by large increments to change the motor speed; and also, when the field strength is so changed, to safely bring the motor to the corresponding changed speed.

In the accompanying drawing, Figures 1, 2, 3, and 4 are diagrams of motor control systems, showing four of the many forms in which my invention may be embodied.

Figure 1:
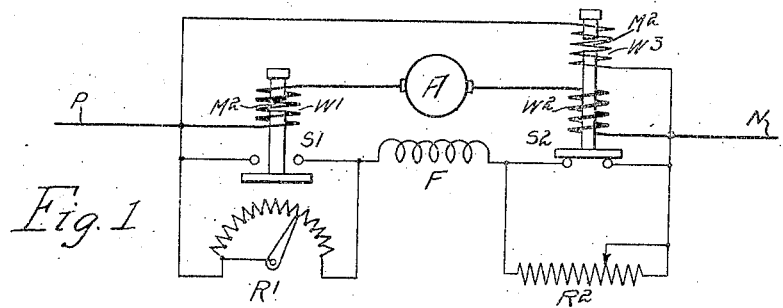

Referring to Fig. 1, A represents the motor armature, F its shunt field, $R^1$ is a speed-regulating rheostat, $R^2$ an adjustable field resistance, and $S^1$ and $S^2$ electromagnetic switches. A winding $W^1$ on the switch $S^1$ and a winding $W^2$ on the switch $S^2$ are connected in series with the armature A across the positive and negative supply mains P and N. The switch $S^2$ has also a shunt winding $W^3$ wound to oppose the winding $W^2$ and connected directly across the mains P and N. The switch $S^1$ is normally open and upon closing short-circuits the regulating rheostat $R^1$. The switch $S^2$ is normally closed, and upon opening inserts the resistance $R^2$ in the field circuit. The field circuit may be traced from the positive main P through the regulating rheostat $R^1$ (or through the contacts of the switch $S^1$ if closed), through the field F, and then by way of the field resistance $R^2$ (or the contacts of the switch $S^2$ if closed) to the negative main. Each of the switches is provided with an adjustable operating gap $M^2$ by which the operating current in the windings of the switches may be adjusted to predetermined values.

The operation of the system shown in Fig. 1 is as follows: Suppose that the armature A is rotating at a certain speed and the running current of the motor is below the predetermined current value necessary to close the switch $S^1$. The switch $S^2$ is closed because of the opposition of its windings. If now the speed regulating rheostat $R^1$ be moved to insert resistance in the field circuit, to weaken the field and increase the speed of the motor, an excessive current will thereupon flow in the armature circuit and close the switch $S^1$, short-circuiting the rheostat $R^1$ and strengthening the field to full strength. Immediately thereupon the current in the armature decreases, causing the switch $S^1$ to open again. This action continues, the armature gradually reaching the new speed for which the rheostat $R^1$ was set, and the switch $S^1$ opening and closing and finally coming to rest again in the open position. During this operation the switch $S^2$ has remained closed.

If it be desired to decrease the speed of the motor, the rheostat $R^1$ is moved to cut out resistance and strengthen the field F. The motor will thereupon act as a generator, reversing the direction of the current in the armature and in the windings $W^1$ and $W^2$. The windings $W^2$ and $W^3$ now assist each other, causing the switch $S^2$ to open. At the same time, according to conditions described later, the switch $S^1$ closes. If the resistance $R^2$ be of a suitable amount, the field will be weakened by the opening of the switch $S^2$, notwithstanding that the rheostat $R^1$ is short-circuited by the switch $S^1$, and the armature current will be decreased by the weakened field. The switch $S^2$ will thereupon close again. This action continues, the switch $S^2$ opening and closing while the armature slows down to the speed for which the rheostat $R^1$ was adjusted. When the motor reaches approximately this new speed, the armature current and hence the current in the winding $W^2$ reverses to its original or normal direction, and the two windings of the switch S² again oppose each other and the switch S² remains closed.

During the operation of the switch S² as just described, the corresponding action of the switch S¹ will depend upon the relative operating current values of the switches S¹ and S², which may be adjusted by adjusting the number of turns in the windings W¹ and W², or by adjusting the relative lengths of the air gaps M², or by any other suitable adjusting means. Thus, by suitable adjustments, the switch S¹ may be made to remain closed throughout the opening and closing operation of the switch S², in which case the resistance R² may be made relatively large to compensate for the short-circuited rheostat R¹; or by other adjustments switch S¹ may be made to vibrate in unison with the switch S²; or by other adjustments the switch S¹ may remain open during the operation of the switch S², in which case the resistance R² may be made relatively small, since it will act in conjunction with the resistance of the rheostat R¹.

Figure 2:
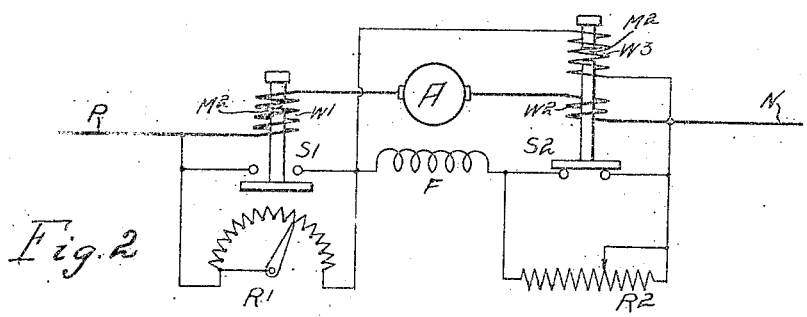

In the system shown in Fig. 2, the winding W³ of the switch S² is wound to oppose the winding W², as in Fig. 1, but is not permanently connected across the supply mains, as in that figure. One terminal of the winding W³ is connected directly to the supply main N and the other to the supply main P through the contacts of the switch S¹, and hence the winding W³ does not receive current until the switch S¹ closes. To prevent the switch S² from opening under the influence of the winding W² alone and before the switch S¹ has closed to energize the opposing winding W³, the winding W² is given fewer turns than the winding W¹ of switch S¹. In the system of Fig. 2, the switch S¹ is preferably adjusted to remain closed during the operation of the switch S², in order to maintain the energization of the winding W³ and to keep the rheostat R¹ short-circuited.

Figure 3:
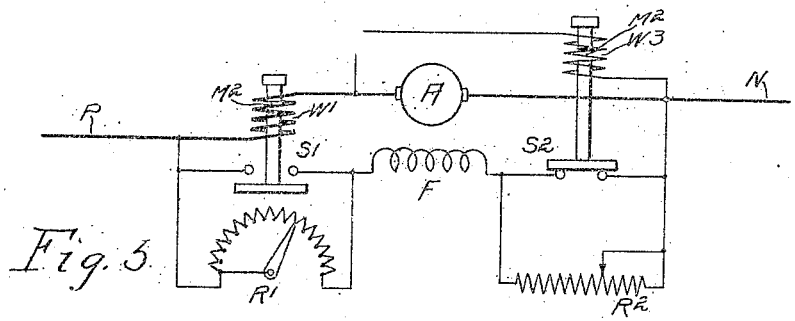

In the system shown in Fig. 3, the switch S² has only a shunt winding W³ connected across the armature terminals. The operation of the switch S¹, while the speed of the motor is being increased, is the same as that in Fig. 1. During its operation the winding W³ of the switch S² is energized by the voltage across the armature terminals, this voltage being somewhat less than line voltage, whereby the energization of the winding W³ is insufficient to open the switch S². During a reduction of the speed of the motor, however, while the motor is acting as a generator, the voltage on the winding W³ is somewhat greater than line voltage, and energizes the winding W³ sufficiently to open the switch S². In other respects the operation of the two switches in Fig. 3 is the same as in Fig. 1.

Figure 4:
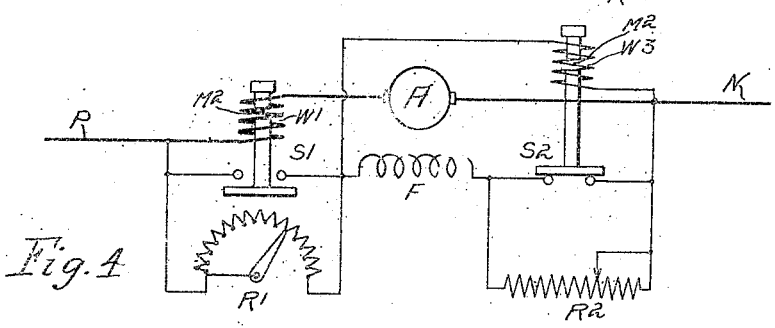

The system shown in Fig. 4 is the same as shown in Fig. 3, except that the winding W³ of the switch S² is not permanently connected across the armature terminals, but is so connected through the contacts of the switch S¹ when it is closed. Preferably the switch S¹ is adjusted to remain closed during the operation of the switch S² in order to maintain the energization of the winding W³ and to keep the rheostat R¹ short-circuited.

In each of the systems above shown and described, it will be seen that when the speed-regulating rheostat is adjusted to vary the motor speed, any tendency of the armature current to rise to excessive values is offset by the action of the switches S¹ and S² which vibrate or "flutter" on their contacts to alternately cut in and cut out field circuit resistance, thereby keeping the armature current within predetermined limits.

Other systems than those shown and described may be made, employing my invention, and the scope of my invention is, therefore, not limited to the exact systems disclosed.

I claim—

1. In a motor control system, a motor, a shunt field circuit therefor, a variable speed-changing resistance and a fixed resistance in the field circuit, a switch for cutting the variable resistance out of and into the field circuit to increase the speed of the motor, and a switch for cutting the fixed resistance into and out of the field circuit to reduce the speed of the motor.

2. In a motor control system, a motor, a shunt field circuit therefor, a rheostat in the field circuit for varying the speed of the motor, a fixed resistance in the field circuit, a switch for cutting the rheostat out of and into the field circuit to increase the speed of the motor when the rheostat is moved to an increased speed position, and a switch for cutting the fixed resistance into and out of the field circuit to decrease the speed of the motor when the rheostat is moved to a decreased speed position.

3. In a motor control system, a motor, a shunt field circuit therefor, a variable speed-changing resistance and a fixed resistance in the field circuit, a switch for cutting the variable resistance out of and into the field circuit to increase the speed of the motor when the variable resistance is increased, and a switch for cutting the fixed resistance into and out of the field circuit to decrease the speed of the motor when the variable resistance is decreased.

4. In a motor control system, a source of supply voltage, a motor, a motor circuit and a shunt field circuit therefor, a variable speed-changing resistance and a fixed resistance in the field circuit, a switch for cutting the variable resistance out of and into the field circuit to increase the speed of the motor and responding to the main motor current, and a switch for cutting the fixed resistance into and out of the field circuit to reduce the speed of the motor and responding to electrical conditions of the motor circuit caused by the greater-than-source voltage at the motor terminals during the slowing down of the motor.

5. In a motor control system, a source of supply voltage, a motor, a motor circuit and a shunt field circuit therefor, a speed changing rheostat and a fixed resistance in the field circuit, a switch for cutting the rheostat out of and into the field circuit to increase the speed of the motor when the rheostat is moved to an increased speed position and responding to the main motor current, and a switch for cutting the fixed resistance into and out of the field circuit to decrease the speed of the motor when the rheostat is moved to a decreased speed position and responding to electrical conditions of the motor circuit caused by the greater-than-source voltage at the motor terminals during the slowing down of the motor.

6. In a motor control system, a source of supply voltage, a motor, a motor circuit and a shunt field circuit therefor, a variable speed changing resistance and a fixed resistance in the field circuit, a switch for cutting the variable resistance out of and into the field circuit to increase the speed of the motor when the variable resistance is increased and responding to the main motor current, and a switch for cutting the fixed resistance into and out of the field circuit to decrease the speed of the motor when the variable resistance is decreased and responding to electrical conditions of the motor circuit caused by the greater-than-source voltage at the motor terminals during the slowing down of the motor.

7. In a motor control system, a source of supply voltage, a motor, a motor circuit and a shunt field circuit therefor, a variable speed-changing resistance and a fixed resistance in the field circuit, a switch for cutting the variable resistance out of and into the field circuit to increase the speed of the motor and responding to the main motor current, and a second switch for cutting the fixed resistance into and out of the field circuit to reduce the speed of the motor and responding only when the first switch is closed to electrical conditions of the motor circuit caused by the greater-than-source voltage at the motor terminals during the slowing down of the motor.

8. In a motor control system, a source of supply voltage, a motor, a motor circuit and a shunt field circuit therefor, a speed changing rheostat and a fixed resistance in the field circuit, a switch for cutting the rheostat out of and into the field circuit to increase the speed of the motor when the rheostat is moved to an increased speed position and responding to the main motor current, and a second switch for cutting the fixed resistance into and out of the field circuit to decrease the speed of the motor when the rheostat is moved to a decreased speed position and responding only when the first switch is closed to electrical conditions of the motor circuit caused by the greater-than-source voltage at the motor terminals during the slowing down of the motor.

9. In a motor control system, a source of supply voltage, a motor, a motor circuit and a shunt field circuit therefor, a variable speed changing resistance and a fixed resistance in the field circuit, a switch for cutting the variable resistance out of and into the field circuit to increase the speed of the motor when the variable resistance is increased and responding to the main motor current, and a second switch for cutting the fixed resistance into and out of the field circuit to decrease the speed of the motor when the variable resistance is decreased and responding only when the first switch is closed to electrical conditions of the motor circuit caused by the greater-than-source voltage at the motor terminals during the slowing down of the motor.

Signed at Cleveland, Ohio, this 3rd day of December, 1917.

JAY H. HALL.